(12) United States Patent
Onishi et al.

(10) Patent No.: US 8,023,097 B2
(45) Date of Patent: *Sep. 20, 2011

(54) DISPLAY PANEL MANUFACTURING METHOD, DISPLAY PANEL MANUFACTURING APPARATUS, AND DISPLAY PANEL

(75) Inventors: Noriaki Onishi, Nara (JP); Kimitaka Ohhata, Sakai (JP); Jun Mikami, Kameyama (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/805,495

(22) Filed: Aug. 3, 2010

(65) Prior Publication Data

US 2010/0294417 A1    Nov. 25, 2010

Related U.S. Application Data

(63) Continuation of application No. 12/234,086, filed on Sep. 19, 2008, which is a continuation of application No. PCT/JP2007/054718, filed on Mar. 9, 2007.

(30) Foreign Application Priority Data

May 16, 2006 (JP) .................................. 2006-136899

(51) Int. Cl.
*G02F 1/13* (2006.01)
*G02F 1/1337* (2006.01)
*B32B 37/00* (2006.01)
*B32B 38/00* (2006.01)

(52) U.S. Cl. ........... 349/192; 349/124; 156/63; 156/379

(58) Field of Classification Search .................. 349/123, 349/124, 187, 192; 156/64, 379
See application file for complete search history.

(56) References Cited

U.S. PATENT DOCUMENTS

| | | | |
|---|---|---|---|
| 5,786,879 A | 7/1998 | Kodera et al. | |
| 5,822,031 A | 10/1998 | Kodera et al. | |
| 6,714,271 B1 * | 3/2004 | Matsuyama et al. | 349/123 |
| 7,089,814 B2 | 8/2006 | Chae et al. | |
| 7,253,872 B2 | 8/2007 | Kume et al. | |
| 2004/0038010 A1 | 2/2004 | Kim et al. | |
| 2004/0134290 A1 | 7/2004 | Chae et al. | |
| 2004/0142119 A1 | 7/2004 | Tanaka | |

(Continued)

FOREIGN PATENT DOCUMENTS

JP    1-169428 A    7/1989

(Continued)

OTHER PUBLICATIONS

U.S. Appl. No. 12/234,086, filed Sep. 19, 2008; Onishi et al.

(Continued)

*Primary Examiner* — Brian M. Healy
*Assistant Examiner* — Michael P Mooney
(74) *Attorney, Agent, or Firm* — Nixon & Vanderhye P.C.

(57) ABSTRACT

A liquid crystal panel 11 includes a pair of substrates 18, 19, liquid crystal 20 disposed between the substrates 18, 19, and alignment films 30, 36 provided on the opposed surfaces of the substrates 18, 19. After formation of the alignment film 30 or 36 is completed in a manufacturing process, it is checked by an inspection process whether a pinhole H is formed on the alignment film 30, 36, and further the position of the pinhole H is detected. Thereafter, an alignment film repair filler 50 is applied to the pinhole H by a repair process, so that the pinhole H is repaired.

18 Claims, 17 Drawing Sheets

U.S. PATENT DOCUMENTS

2006/0050223 A1 3/2006 Umetsu
2007/0273799 A1 11/2007 Kume et al.
2008/0309698 A1 12/2008 Nakano

FOREIGN PATENT DOCUMENTS

| | | |
|---|---|---|
| JP | 5-313167 | 11/1993 |
| JP | 6-160857 | 6/1994 |
| JP | 8-83976 A | 3/1996 |
| JP | 8-123044 A | 5/1996 |
| JP | 9-166783 A | 6/1997 |
| JP | 2001-133803 | 5/2001 |
| JP | 2003-107479 | 4/2003 |
| JP | 2004-160520 | 6/2004 |
| JP | 2005-106997 | 4/2005 |
| JP | 2005-274709 | 10/2005 |
| JP | 2006-72229 | 3/2006 |
| KR | 2000-0038295 A | 7/2000 |
| KR | 2000-0038296 A | 7/2000 |
| KR | 10-2004-0062122 A | 7/2004 |
| WO | WO 2006/022217 | 3/2006 |

OTHER PUBLICATIONS

International Search Report for PCT/JP2007/054718, mailed Apr. 10, 2007.

Supplementary European Search Report dated May 4, 2011.

* cited by examiner

DISPLAY PANEL MANUFACTURING METHOD, DISPLAY PANEL MANUFACTURING APPARATUS, AND DISPLAY PANEL

CROSS REFERENCE TO RELATED APPLICATION

This application is a Continuation of Ser. No. 12/234,086, filed Sep. 19, 2008, which is a Continuation of National Phase PCT/JP2007/054718, filed Mar. 9, 2007, which designates the United States, which claims priority on JP 2006-136899, filed May 16, 2006, the entire contents of which are all hereby incorporated herein by reference in this application.

BACKGROUND OF THE INVENTION

1. Field of the Invention

The present invention relates to a display panel manufacturing method, a display panel manufacturing apparatus, and a display panel.

2. Description of the Related Art

A liquid crystal panel, as a main component of a liquid crystal display device, generally has a construction in which liquid crystal is disposed between a pair of glass substrates. TFTs as active devices, pixel electrodes and the like are provided on the inside surface of one of the glass substrates, while a color filter, an opposite electrode and the like are provided on the inside surface of the other of the glass substrates. An alignment film for alignment control of the liquid crystal molecules is formed on the surface of each glass substrate that is in contact with the liquid crystal.

A construction described in JP-A-2005-106997 is known as an example of a liquid crystal panel that includes alignment films.

Pinholes may be locally developed on the above-described alignment films for the following reasons.

(1) When a foreign substance slips in during an alignment-film-forming process so as to adhere to the alignment film, the alignment film is locally removed due to elimination of the foreign substance, resulting in a pinhole.

(2) When adhesion of an alignment film to its underlying base (e.g., pixel electrodes or an opposite electrode) is locally degraded, the alignment film material at the degraded portion is repelled during film formation, resulting in a pinhole.

(3) When an alignment film material for vertical alignment of liquid crystal molecules is used, adhesion of the alignment film to its underlying base is prone to degradation, which combined with the above (2) would cause a pinhole.

(4) When an alignment film having an uneven surface is formed by providing depressed portions or raised portions on the underlying base of the alignment film in order to control the alignment of the liquid crystal molecules, a larger area of the underlying base is covered with the alignment film, which combined with the above (2) would cause a pinhole.

If pinholes are locally developed on the alignment film for the above reasons, images cannot be displayed properly at those portions. Then, the alignment film should be completely removed and re-formed, depending on the sizes and/or positions of the pinholes. These problems result in increase in manufacturing cost.

SUMMARY OF THE INVENTION

The present invention was made in view of the foregoing circumstances, and an object thereof is to reduce manufacturing cost.

According to the present invention, in a process for manufacturing a display panel in which liquid crystal is disposed between a pair of substrates arranged opposite to each other and an alignment film is provided on an opposed surface of the substrates, a display panel manufacturing method includes inspecting the alignment film for the presence of a film defective part by an inspection process, detecting the position of the film defective part by a position detection process, and applying an alignment film repair filler to at least a portion of the film defective part by a repair process so as to repair the film defective part.

A display panel manufacturing apparatus according to the present invention, which is a manufacturing apparatus for a display panel in which liquid crystal is disposed between a pair of substrates arranged opposite to each other and an alignment film is provided on an opposed surface of the substrates, includes an inspection means arranged to inspect the alignment film for the presence of a film defective part, a position detection means arranged to detect the position of the film defective part, and a filler application means arranged to apply an alignment film repair filler to at least a portion of the film defective part so as to repair the film defective part.

A display panel according to the present invention includes a pair of substrates arranged opposite to each other, liquid crystal disposed between the substrates, an alignment film provided on an opposed surface of the substrates, and a repair part in which an alignment film repair filler is applied to at least a portion of a film defective part developed on the alignment film.

According to the construction, when a film defective part is detected by an inspection process, the position of the film defective part is detected by the following position detection process. Thereafter, an alignment film repair filler is applied to at least a portion of the film defective part by a repair process, so that the film defective part is repaired. Thereby, the yield rate can be improved, compared to the conventional case where an alignment film including a film defective part is re-formed, for example.

According to some aspects of the present invention, the following preferable constructions are provided.

(1) A stamping technique is used in the repair process of the display panel manufacturing method, so that the alignment film repair filler is transferred to the film defective part from a transfer means to which the alignment film repair filler is attached. Further, the filler application means of the display panel manufacturing apparatus includes a transfer means arranged to transfer the alignment film repair filler to the film defective part. Thereby, the film thickness of the repair part can be readily adjusted, compared to the case where a technique for dropping droplets of an alignment film repair filler into a film defective part is used in a repair process, for example.

(2) In the repair process of the display panel manufacturing method, a transfer head, to which the alignment film repair filler is attached, is pressed to the film defective part in order to transfer the alignment film repair filler. Further, the transfer means of the display panel manufacturing apparatus includes a transfer head, to which the alignment film repair filler is attached, and which is pressed to the film defective part. Thereby, the film thickness of the repair part can be readily adjusted by controlling the duration time and/or the pressure intensity when the transfer head is pressed to the film defective part. Further, a locally-developed film defective part can be readily repaired, compared to the case where the transfer of an alignment film repair filler is achieved by a transfer roller, for example.

(3) The alignment film repair filler used in the display panel manufacturing method is formed by dissolving an alignment film material in solvent, and the transfer head after finishing repair waits while being immersed in the alignment film repair filler. Further, the display panel manufacturing apparatus includes a dryness prevention means, in which the alignment film repair filler formed by dissolving an alignment film material in solvent is stored, and which is capable of containing the transfer head that is waiting after finishing repair. Thereby, drying of the surface of the transfer head due to evaporation of the alignment film repair filler can be prevented after the repair is finished.

(4) The transfer head used in the display panel manufacturing method is formed of a porous material having flexibility. Further, the transfer head of the display panel manufacturing apparatus is formed of a porous material having flexibility. Thereby, the film thickness of the repair part can be further readily adjusted. Further, the alignment film repair filler can be reliably applied to the film defective part due to deformation of the flexible transfer head, even if a stepped area is formed around the film defective part.

(5) A surface modification process for facilitating adhesion of the alignment film repair filler to the film defective part is performed before the repair process of the display panel manufacturing method. Further, the display panel manufacturing apparatus includes a surface modification means arranged to modify the surface of the film defective part in order to facilitate adhesion of the alignment film repair filler to the film defective part. Thereby, the repair can be reliably achieved, because the alignment film repair filler can easily adhere to the film defective part in the repair process.

(6) Ultraviolet light is radiated to the film defective part in the surface modification process of the display panel manufacturing method. Further, the surface modification means of the display panel manufacturing apparatus includes an ultraviolet radiator arranged to radiate ultraviolet light to the film defective part. Thereby, the surface modification can be suitably achieved by radiating ultraviolet light to the film defective part. Further, the processing time can be reduced, compared to the case where the surface modification is achieved by a wet process, for example.

(7) The ultraviolet light is radiated at a wavelength of 146 nm to 365 nm in the display panel manufacturing method. Further, the ultraviolet radiator of the display panel manufacturing apparatus radiates the ultraviolet light at a wavelength of 146 nm to 365 nm. Thereby, the surface modification of the film defective part can be further suitably achieved.

(8) The alignment film of the display panel has a function for aligning liquid crystal molecules in a direction substantially perpendicular to a surface of the alignment film when a voltage is not applied to the liquid crystal. In the case of the alignment film thus having the so-called vertical alignment function, its adhesion to the substrate may be degraded, and therefore a film defective part can be easily formed during the manufacture thereof. However, the alignment film repair filler can be applied to the film defective part so as to form the repair part. Thus, the film defective part can be repaired so that the yield rate is effectively improved.

(9) An uneven portion for alignment control of the liquid crystal is provided on a surface of the substrates of the display panel, and the alignment film is formed along the uneven portion. In the case that the uneven portion is thus formed on the surface of the substrate, a larger area of the substrate may be covered with the alignment film, and therefore a film defective part can be easily formed. However, the alignment film repair filler can be applied to the film defective part so as to form the repair part. Thus, the film defective part can be repaired so that the yield rate is effectively improved.

(10) The film thickness of the repair part of the display panel is set to between 50 nm and 200 nm. Thereby, excellent display performance can be obtained.

BRIEF DESCRIPTION OF THE DRAWINGS

Other features and advantages of the present invention will become more apparent from the following detailed description made with reference to the attached drawings. In the drawings.

DETAILED DESCRIPTION OF THE INVENTION

Embodiment

Figure 1:
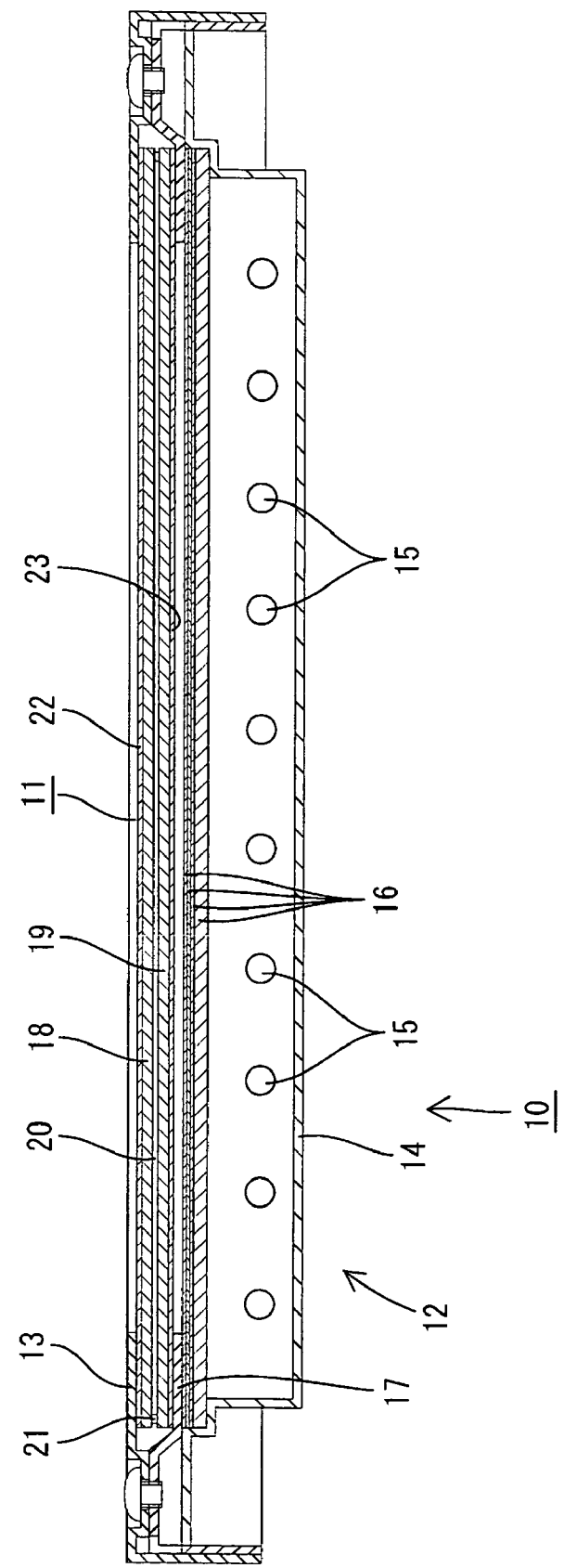
FIG. 1 is a sectional view of a liquid crystal display device according to an embodiment of the present invention.

An embodiment according to the present invention will be explained with reference to FIGS. 1 through 17. A liquid crystal panel 11 included in a liquid crystal display device 10 will be illustrated in the present embodiment. In the following explanations, the lower side of FIG. 1 is referred to as the back side, while the upper side thereof is referred to as the front side.

First, the construction of the liquid crystal display device 10 will be explained. As shown in FIG. 1, the liquid crystal display device 10 generally has a construction, in which a liquid crystal panel 11 for image display and a backlight 12 arranged as an external light source on the back side (or rear side) of the liquid crystal panel 11 are fixed to each other. The liquid crystal panel 11 is held so as to be sandwiched between the back-side backlight 12 and a bezel 13 that has a substantially frame-like shape and is arranged on the front side (or anterior side).

The backlight 12 includes a casing 14 having a substantially box-like shape with a front-side (i.e., liquid crystal panel 11 side) opening, a plurality of linear light sources 15 (e.g., cold cathode tubes) arranged parallel to one another in the casing 14, a plurality of optical sheets 16 arranged in a stack (e.g., a diffuser plate, a diffusing sheet, a lens sheet and a brightness enhancement sheet, arranged in this order from the back side) in the opening of the casing 14, and a substantially rectangular-shaped frame 17 for holding the optical sheets 16 together with the casing 14 and therebetween. The optical sheets 16 have a function for converting light from each linear light source 15 into flat light, and the like.

Next, the liquid crystal panel 11 will be explained in detail. The liquid crystal panel 11 generally includes a pair of transparent (or light transmissive) glass substrates 18, 19, and liquid crystal 20 disposed between the substrates 18, 19 as a material with an optical property that changes with applied voltage. The substrates 18, 19 are attached to each other so as to face each other, while a predetermined distance (or gap) is kept therebetween due to spacers not shown. The liquid crystal 20 therebetween is held in a liquid tight state by a surrounding sealant 21. A pair of front and back polarizing plates 22, 23 are attached on the outer surface sides of the respective substrates 18, 19.

Figure 2:
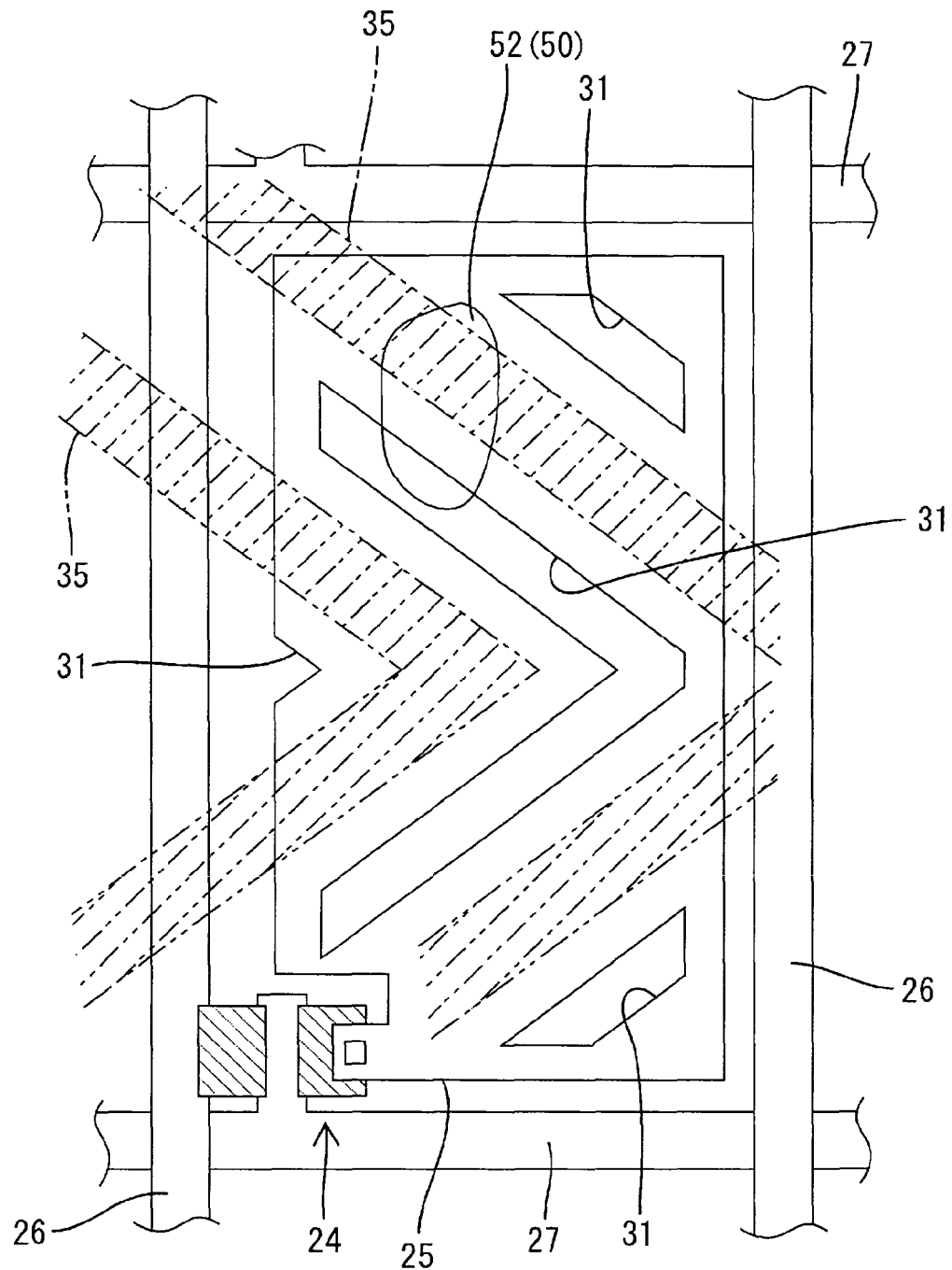
FIG. 2 is an enlarged plan view of an array substrate.
Figure 3:
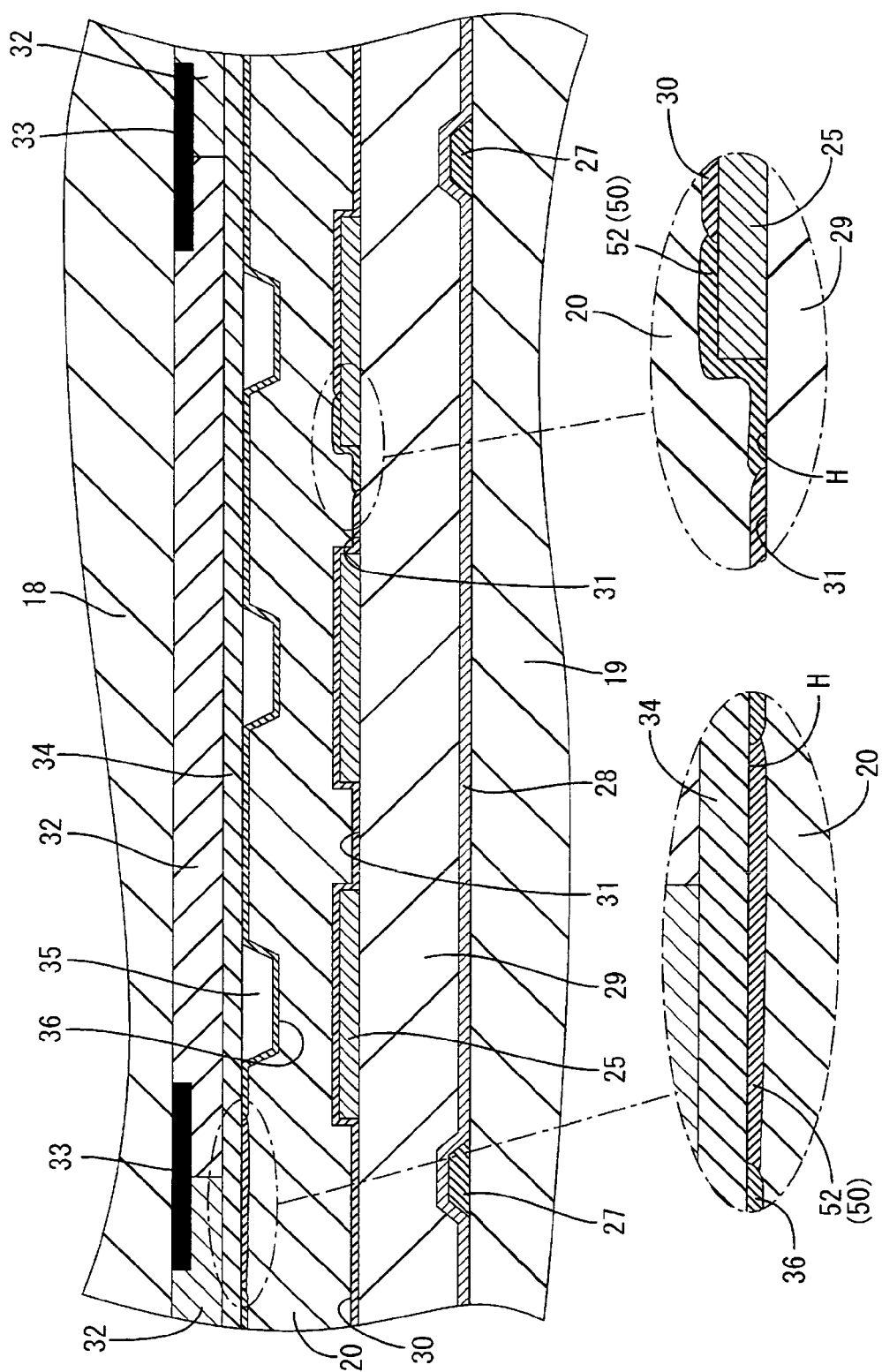
FIG. 3 is an enlarged sectional view of a liquid crystal panel.

The front-side one of the substrates 18, 19 is provided as a CF substrate 18, while the back-side one thereof is provided as an array substrate 19. On the inner surface side (i.e., liquid crystal 20 side or CF substrate 18 facing surface side) of the array substrate 19, as shown in FIG. 2, a large number of switching elements 24 (e.g., TFTs) and pixel electrodes 25 are arranged, and further source wiring lines 26 and gate wiring lines 27 are arranged in a grid pattern so as to surround the switching elements 24 and the pixel electrodes 25. The source wiring line 26 and the gate wiring line 27 are connected respectively to the source electrode and the gate electrode of the switching element 24, while the pixel electrode 25 is connected to the drain electrode of the switching element 24. As shown in FIG. 3, insulating layers 28, 29 are provided in a stack between the pixel electrodes 25 and the array substrate 19 or the wiring lines 26, 27.

Each pixel electrode 25 is formed of ITO (Indium-tin-oxide), for example, so as to have a substantially rectangular shape elongated along the extending direction of the source wiring lines 26, as shown in FIG. 2. An alignment film 30 for directional alignment of the liquid crystal 20 is provided on the pixel electrodes 25 and on the inner surface side of the outer insulating layer 29 (i.e., provided between the liquid crystal 20 and the pixel electrodes 25 or the insulating layer 29). The alignment film 30 is formed of a so-called vertical alignment type material (e.g., polyimide), so as to align the liquid crystal molecules in a direction perpendicular to the surface of the alignment film 30 when a voltage is not applied to the liquid crystal 20. The film thickness of the alignment film 30 is set to about 100 nm to 200 nm, for example. In the present embodiment, the pixel electrodes 25 and the insulating layer 29 are thus provided as the underlying base for the alignment film 30. However, in a liquid crystal panel having another stack structure, a layer provided as the underlying base may differ from the above.

Slits 31 (corresponding to a groove, an opening or an uneven portion) are provided on the pixel electrode 25 (or on the surface of the array substrate 19), so that the alignment film 30 formed along the pixel electrode 25 has an uneven surface. Specifically, each slit 31 is formed as a groove-like depression having a predetermined width, and is located at the longitudinal center position of the pixel electrode 25, at a position around either longitudinal end thereof, or at an intermediate position therebetween. The slit 31 at the intermediate position is V-shaped when viewed from the top. The slit 31 at the center position is arranged on the side edge of the pixel electrode 25, and is triangular shaped when viewed from the top. The slit 31 at each end side forms a linear shape substantially parallel to the center-side slit 31. The slits 31 are arranged substantially evenly spaced apart. By the uneven portions formed on the alignment film 30 due to the slits 31, the alignment of the liquid crystal molecules can be controlled so that they form an angle with the vertical direction in FIG. 3 (i.e., with the direction perpendicular to the surfaces of the substrates 18, 19). Consequently, a rubbing process conventionally performed for the alignment film 30 can be eliminated. The depths of the slits 31 are set so that they reach the insulating layer 29.

The source terminal portion and the gate terminal portion formed on the ends of the respective source wiring lines 26 and gate wiring lines 27 are arranged on an end portion of the array substrate 19. The one end side of a thin-film driver (electronic component) such as SOF (System On Film) is connected to each of the terminal portions via an ACF (Anisotropic Conductive Film) by clamping connection. A printed board connected to an external circuit is connected to the other end side of the SOF via an ACF by clamping connection.

On the other hand, as shown in FIG. 3, a large number of color filters 32 are arranged on the inner surface side (i.e., liquid crystal 20 side or array substrate 19 facing surface side) of the front-side CF substrate 18, so as to correspond to the respective pixel electrodes 25. Each color filer 32 has a function for allowing transmission of light of a predetermined wavelength and absorbing light of other wavelengths. The color filters 32 of three colors are provided, which includes those selectively transmitting light of R(Red)-wavelength, those selectively transmitting light of G(Green)-wavelength and those selectively transmitting light of B(Blue)-wavelength. The color filters 32 of R, G and B are arranged, for example, in this order along the extending direction of the gate wiring lines 27 shown in FIG. 2, so that the colors of adjacent color filters 32 differ from each other.

A light blocking layer 33 (black matrix) is provided between adjacent color filters 32 of different colors, so that light from neighboring color filters 32 can be blocked. Thus, color mixture is prevented. The light blocking layer 33 is arranged in a grid pattern so as to surround each color filer 32. An opposite electrode 34, which is formed of the same ITO as the pixel electrodes 25, for example, is provided on the inside surfaces of the color filters 32.

Ribs 35 (corresponding to a convex portion, a protruding portion or an uneven portion) are provided on the inner surface side of the opposite electrode 34. Specifically, the ribs 35 protrude from the inside surface of the opposite electrode 34 toward the opposed array substrate 19 side, so as to form an elongated ridge having a predetermined width. As shown in FIG. 2, each rib 35 is V-shaped when viewed from the top, and is located alongside at a substantially intermediate position between slits 31 which are arranged adjacent to each other on the array substrate 19 side. Each rib 35 is arranged so that its axial direction is substantially parallel to the extending direction of the slits 31. An alignment film 36 for directional alignment of the liquid crystal 20 is provided on the inner surface sides of the opposite electrode 34 and the ribs 35 (i.e., provided between the liquid crystal 20 and the opposite electrode 34 or the ribs 35). By the uneven portions formed on the surface of the alignment film 36 due to the ribs 35 protruding from the opposite electrode 34, the alignment of the liquid crystal molecules is controlled so that they form an angle with the vertical direction in FIG. 3 (i.e., with the direction perpendicular to the surfaces of the substrates 18, 19). Consequently, a rubbing process conventionally performed for the alignment film 36 can be eliminated.

The alignment film 36 is formed of a so-called vertical alignment type material (e.g., polyimide) similarly to the alignment film 30 on the array substrate 19 side, so as to align the liquid crystal molecules in a direction perpendicular to the surface of the alignment film 36 when a voltage is not applied to the liquid crystal 20. The film thickness of the alignment film 36 is set to about 100 nm to 200 nm, for example. In the present embodiment, the opposite electrode 34 and the ribs 35 are thus provided as the underlying base for the alignment film 36. However, in a liquid crystal panel having another stack structure, a layer provided as the underlying base may differ from the above.

In the liquid crystal panel 11 having the above-described construction, defects may be developed on the alignment film 30 or 36 during a manufacturing process. The defects include a foreign substance defect, i.e., adhesion of a foreign substance X to the alignment film 30, 36, and further include a pinhole defect, i.e., a pinhole H (a film defective part) locally formed on the alignment film 30, 36. In the present embodiment, an alignment film 30, 36 after the film forming process is inspected for the presence and type of a defect. If a defect is then found, the position of the defect is detected, and the defect is repaired. An inspection/repair apparatus 40 will be hereinafter explained, which has an inspection function for checking for the presence of a defect, a position detection function for detecting the position of the defect, and a repair function for repairing the defect.

Figure 4:
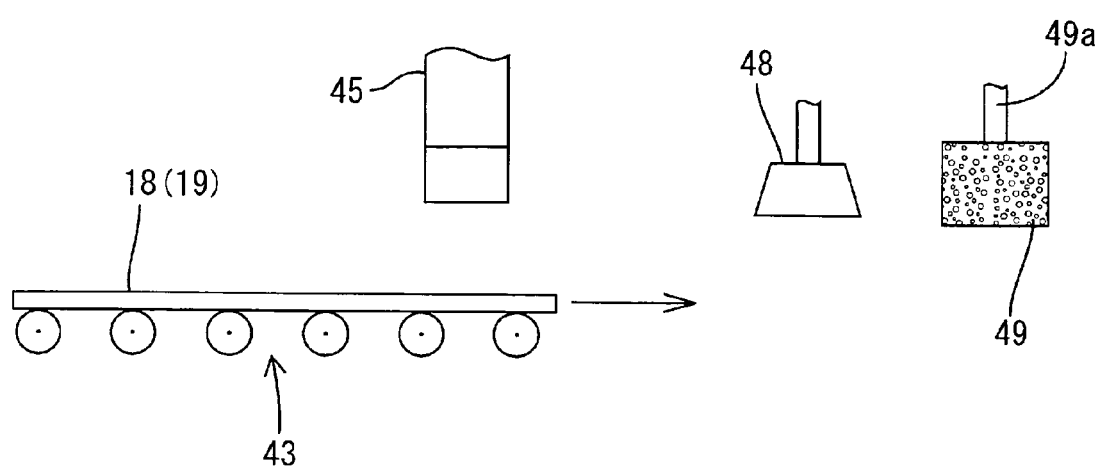
FIG. 4 is a schematic side view of an inspection/repair apparatus.
Figure 5:
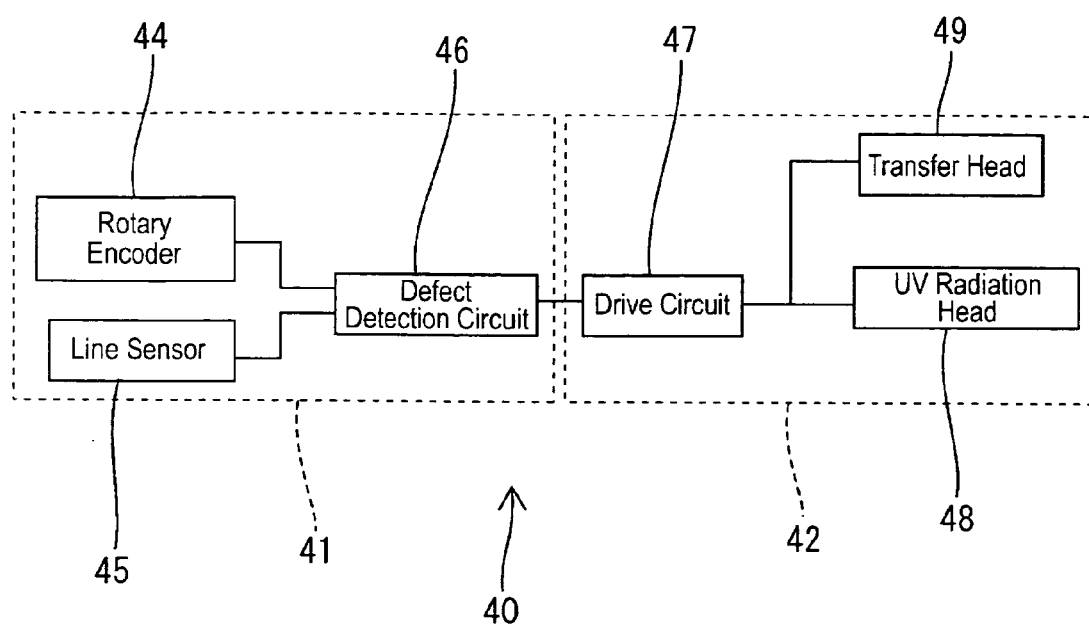
FIG. 5 is a block diagram of the inspection/repair apparatus.

The inspection/repair apparatus 40 generally includes an inspection section 41 and a repair section 42. As shown in FIGS. 4 and 5, the inspection section 41 includes a conveyer 43 (corresponding to a conveyer means or a conveyer device) for conveying a CF substrate 18 or an array substrate 19 after the film forming process, a rotary encoder 44 (corresponding to a drive state detection means or a drive state detection device for the conveyer means) disposed on the drive section of the conveyer 43 for detecting the drive state of the drive section, a line sensor 45 (corresponding to an imaging means or an imaging device) for imaging the surface of the conveyed substrate 18, 19, and a defect detection circuit 46 for processing signals outputted from the rotary encoder 44 or the line sensor 45.

On the other hand, the repair section 42 includes a drive circuit 47 that receives defect position information outputted from the defect detection circuit 46. Further included are a UV radiation head 48 (corresponding to an ultraviolet radiator, a surface modification means or a surface modification device) and a transfer head 49 (corresponding to a transfer means or a transfer device), which are provided for repairing a defect based on signals outputted from the drive circuit 47.

The inspection section 41 will be described in detail. The conveyer 43 can convey the substrate 18, 19 in its long-side direction and with a predetermined speed, while holding it in a horizontal position. The rotary encoder 44 can output a pulse signal to the defect detection circuit 46, based on the drive state of the drive section of the conveyer 43. Alternatively, the substrate 18, 19 may be conveyed in its short-side direction.

In the line sensor 45, a number of light receiving elements are linearly arranged so that the array direction of the light receiving element is perpendicular to the conveying direction (main scanning direction) of the substrate 18, 19 on the conveyer 43 and is parallel to the horizontal direction. The array direction of the light receiving elements corresponds to the secondary scanning direction. The line sensor 45 can image the surface condition of the substrate 18, 19, and output light sensitive signals from the respective light receiving elements to the defect detection circuit 46.

The defect detection circuit 46 can detect the presence, type and position of a defect based on the pulse signal from the rotary encoder 44 and the light sensitive signals from the line sensor 45. The defect detection circuit 46 determines the presence and type of a defect, for example, by comparing the surface conditions of adjacent pixels based on the light sensitive signals from the line sensor 45, and thereby classifying pixels into those corresponding to non-defective areas, those corresponding to a foreign substance defect and those corresponding to a pinhole defect. On the other hand, in order to determine the position of a defect, the position of the defect in the main scanning direction is detected based on the pulse signal from the rotary encoder 44 while the position of the defect in the secondary scanning direction is detected based on the light sensitive signals from the line sensor 45, resulting in obtaining two-dimensional (i.e., X-directional and Y-directional) position information of the defect on the substrate 18, 19. In the case that a foreign substance defect is detected, a process for removing the foreign substance X is performed, during which a portion of the alignment film 30 or 36, as well as the foreign substance X, is removed so as to form a pinhole H (i.e., a film defective part).

Next, the repair section 42 will be described in detail. The drive circuit 47 can move the UV radiation head 48 and the transfer head 49 in X-, Y-, and Z-directions, based on the defect position information outputted from the defect detection circuit 46.

Based on a signal from the drive circuit 47, the UV radiation head 48 is moved to the position of a pinhole H formed on the substrate 18, 19. The UV radiation head 48 includes a Xe2 excimer lamp as a light source, which can radiate excimer UV light (vacuum ultraviolet light) having a center wavelength of 172 nm. Due to the excimer UV light, the organic matters adhering to the surface of the substrate 18, 19 on which the pinhole H is developed (i.e., adhering to the surface of any pixel electrode 25 or the insulating layer 29 on the array substrate 19, or adhering to the surface of the opposite electrode 34 or any rib 35 on the CF substrate 18) can be destructed and removed. Thus, the so-called dry cleaning can be achieved. Alternatively, a mercury lamp (center wavelength: 180 nm-400 nm), a KrF excimer laser (wavelength: 248 nm), an ArF excimer laser (wavelength: 193 nm), or a Kr2 excimer lamp (center wavelength: 146 nm) may be used as the light source of the UV radiation head 48, for example. A light source that radiates ultraviolet light having a wavelength (center wavelength) of 146 nm to 365 nm is preferable for the UV radiation head 48. Obviously, a light source other than the above (such as a light source that radiates ultraviolet light other than excimer UV light) can be used. Further preferably, the light source can radiate quasi-monochromatic light having a short center wavelength (i.e., a wavelength equal to or less than 200 nm). This type of light source results in increase in energy conversion efficiency and suppression of heat damage of irradiated portions.

Based on a signal from the drive circuit 47, the transfer head 49 is moved to the position of the pinhole H formed on the substrate 18, 19. An alignment film repair filler 50 is attached to the transfer head 49, and therefore the alignment film repair filler 50 can be transferred to the pinhole H by pressing the transfer head 49 to the pinhole H (See FIG. 10 or 16). Specifically, the transfer head 49 is formed of a porous material having flexibility, so as to be capable of absorbing and containing a predetermined amount of alignment film repair filler 50 therein and further capable of elastic deformation. The alignment film repair filler 50 is formed by dissolving an alignment film material (e.g., polyimide) in solvent. The support shaft 49a for supporting the transfer head 49 is made of glass, for example, so that the alignment film repair filler 50 cannot easily travel from the transfer head 49 to the support shaft 49a.

Figure 6:
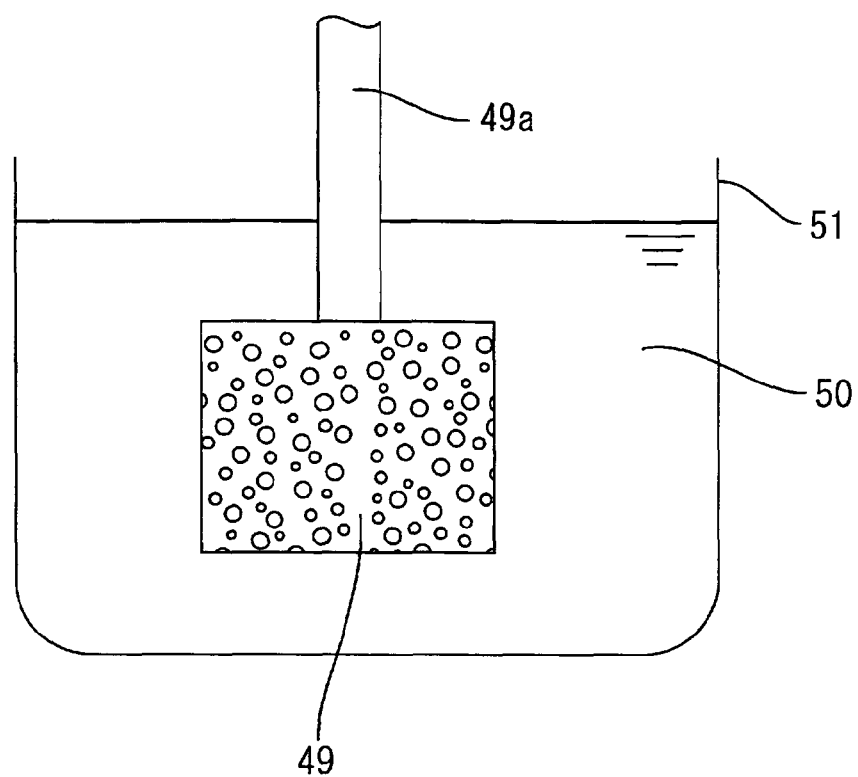
FIG. 6 is a diagram showing a container for holding a transfer head therein.

As shown in FIG. 6, the transfer head 49 after finishing the repair (or transfer operation) waits while being held in a container (corresponding to a dryness prevention means or a dryness prevention device) in which an alignment film repair filler 50 is stored. In the container 51, the alignment film repair filler 50 is consistently supplied to the transfer head 49. Thereby, drying of the surface of the waiting transfer head 49 due to evaporation of the solvent of the alignment film repair filler 50 from the surface can be prevented.

This is the end of explanation for the construction of the present embodiment. Next, the operation thereof will be explained. When a process for forming an alignment film 30 or 36 is completed, the substrate 18 or 19 is conveyed to the inspection/repair apparatus 40. During an inspection process (that includes a position detection process), while the substrate 18, 19 is conveyed by the conveyer 43 as shown in FIG. 4, the surface condition thereof is imaged by the line sensor 45. At the time, a pulse signal that is from the rotary encoder 44 disposed on the drive section of the conveyer 43 and is based on the drive state, and light sensitive signals from the line sensor 45 are inputted to the defect detection circuit 46, as shown in FIG. 5.

The defect detection circuit 46 detects the presence, type and position of a defect (i.e., a foreign substance defect or a pinhole defect) based on the above two kinds of signals. If a defect has not been found, the substrate 18, 19 is conveyed to the next stage of the manufacturing process without being conveyed to the repair process. If a defect has been found, the substrate 18, 19 is conveyed to a foreign substance removal process when the type thereof is a foreign substance defect. In the case of a pinhole defect, the substrate 18, 19 is conveyed to the repair process.

Figure 7:
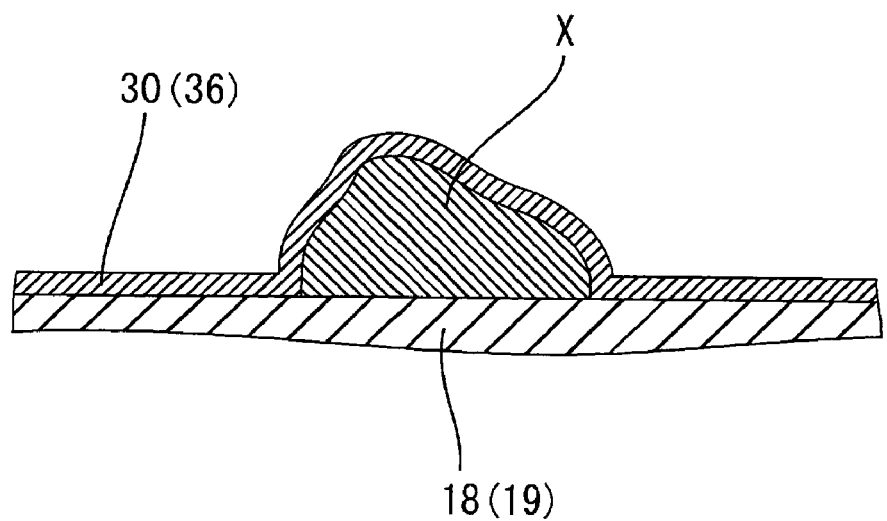
FIG. 7 is a sectional view showing when a foreign substance is adherent to a substrate.

When a foreign substance defect is detected as shown in FIG. 7, the foreign substance X is removed using a removal tool such as a needle. At the time, a portion of the alignment film 30, 36, as well as the foreign substance X, will be removed, resulting in a pinhole H formed at a position from which the foreign substance X is removed. The substrate 18, 19 after the removal of the foreign substance X is conveyed to the repair process, which will be hereinafter explained.

Figure 8:
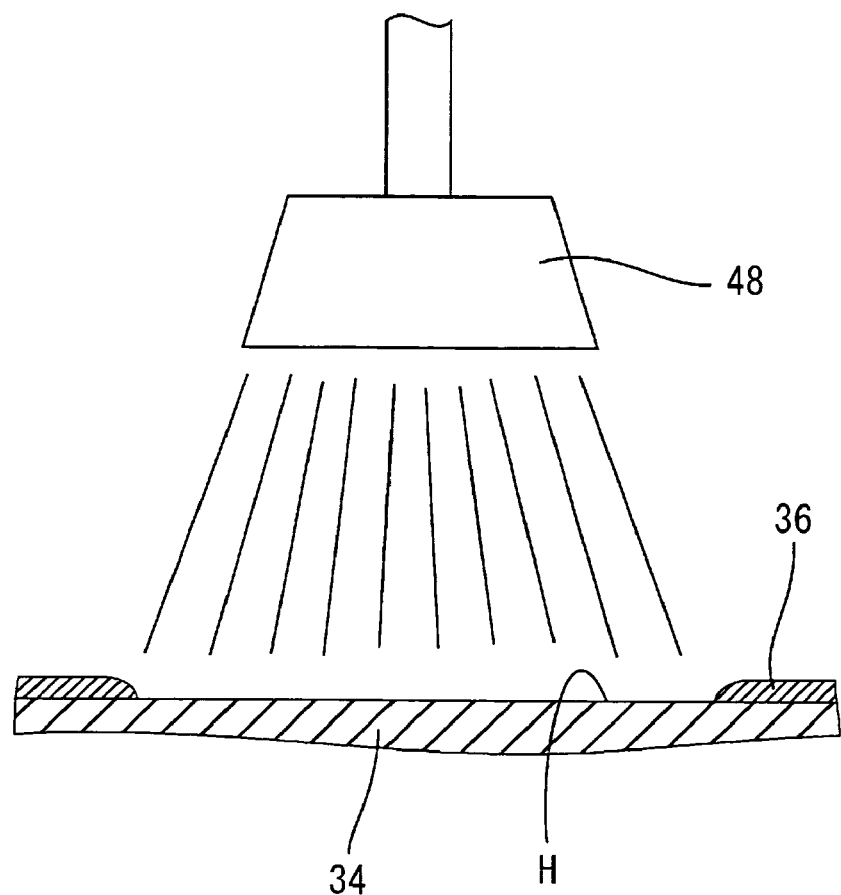
FIG. 8 is a sectional view showing when a pinhole on the CF substrate is irradiated with excimer UV light.

In the repair process, the pinhole H formed on the alignment film 30, 36 is repaired. The concrete description will be made on the case where a pinhole H is formed as shown in FIG. 8 on the alignment film 36 on the CF substrate 18, for example, so that a flat exposed area of the underlying base (e.g., the opposite electrode 34 in FIG. 8) of the alignment film 36 is provided through the pinhole H. First, the UV radiation head 48 is moved and positioned by the drive circuit 47 so as to be aligned with the pinhole H. Then, the pinhole H is irradiated with excimer UV light from the UV radiation head 48 for a predetermined duration, so that the organic matters adhering to the exposed surface of the underlying base provided through the pinhole H is destructed and removed. Thus, a surface modification process is performed, and thereby adhesion of the underlying base to the alignment film repair filler 50 (or wettability thereof) is improved.

Figure 9:
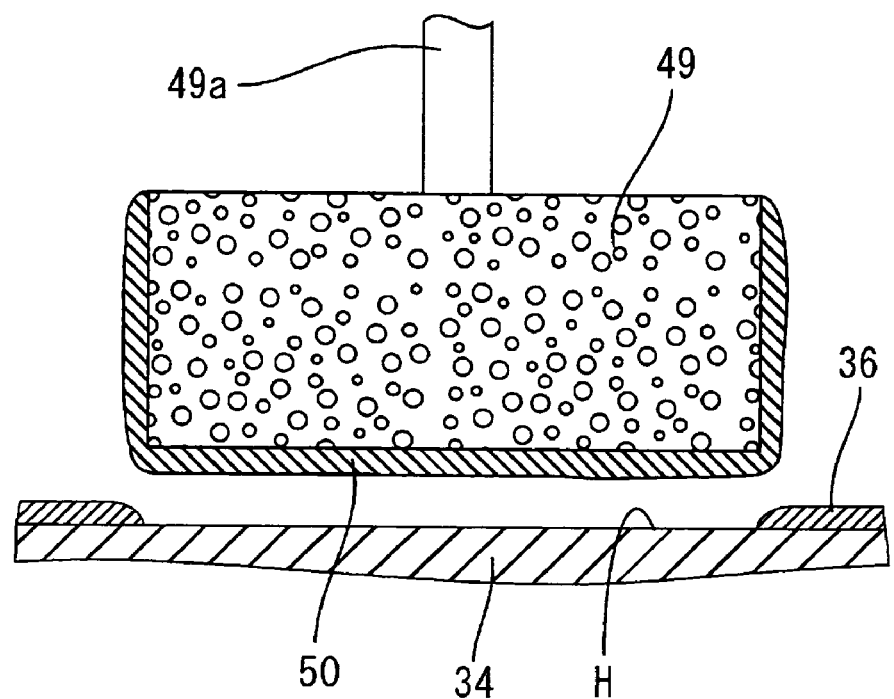
FIG. 9 is a sectional view showing when the transfer head is positioned to be aligned with the pinhole.
Figure 10:
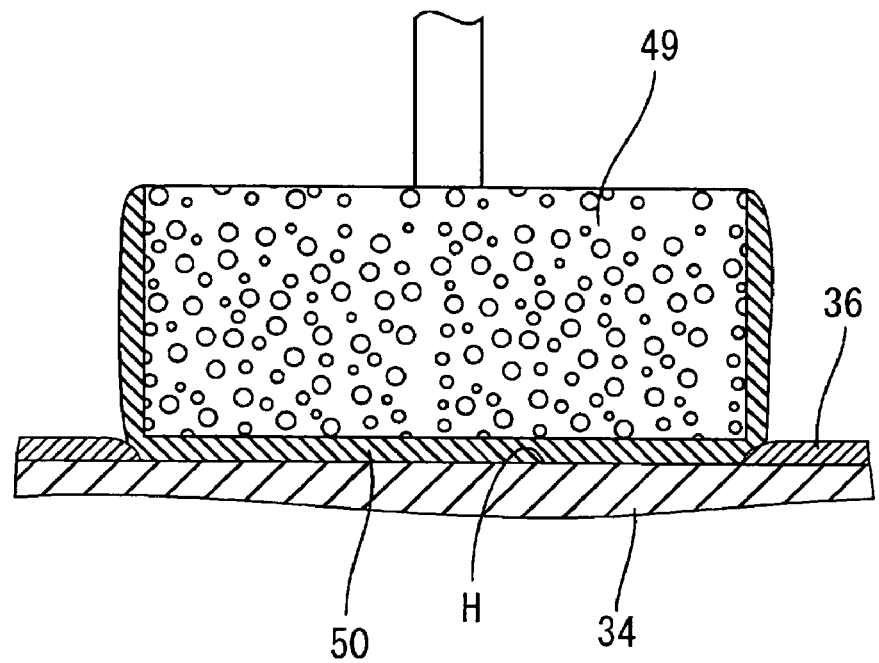
FIG. 10 is a sectional view showing when the transfer head is pressed to the pinhole.
Figure 11:
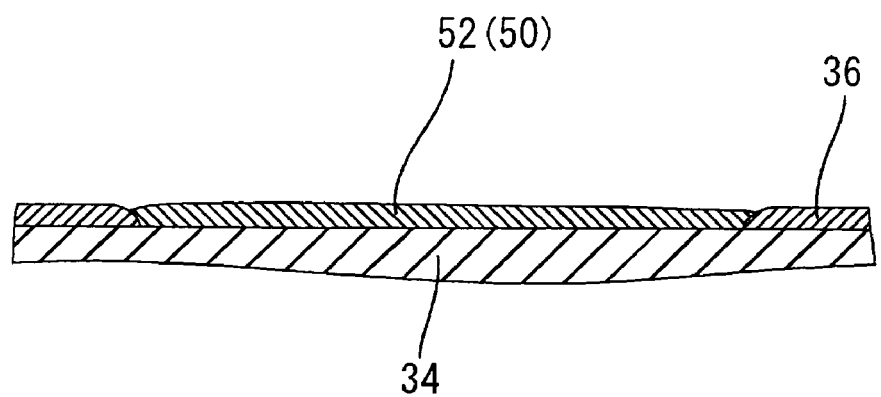
FIG. 11 is a sectional view showing when an alignment film repair filler is attached to the pinhole.

After the surface modification process is completed, the transfer head 49 is moved and positioned by the drive circuit 47 so as to be aligned with the cleaned pinhole H, as shown in FIG. 9. Then, the transfer head 49 is pressed to the pinhole H for a predetermined duration, as shown in FIG. 10. When the transfer head 49 is thereafter raised up, the alignment film repair filler 50 on the transfer head 49 is transferred to the substantially entire area of the pinhole H, as shown in FIG. 11. At the time, the alignment film repair filler 50 can easily adhere to the pinhole H, due to the foregoing dry cleaning. The film thickness of the repair part 52 can be adjusted to conform to the surrounding alignment film 36, by controlling the duration time and/or the pressure intensity when the transfer head 49 is pressed against the pinhole H. Further, the film thickness of the repair part 52 can be also adjusted by controlling the density of the alignment film repair filler 50. The transfer head 49 after finishing the transfer is placed in the container 51 shown in FIG. 6.

Figure 12:
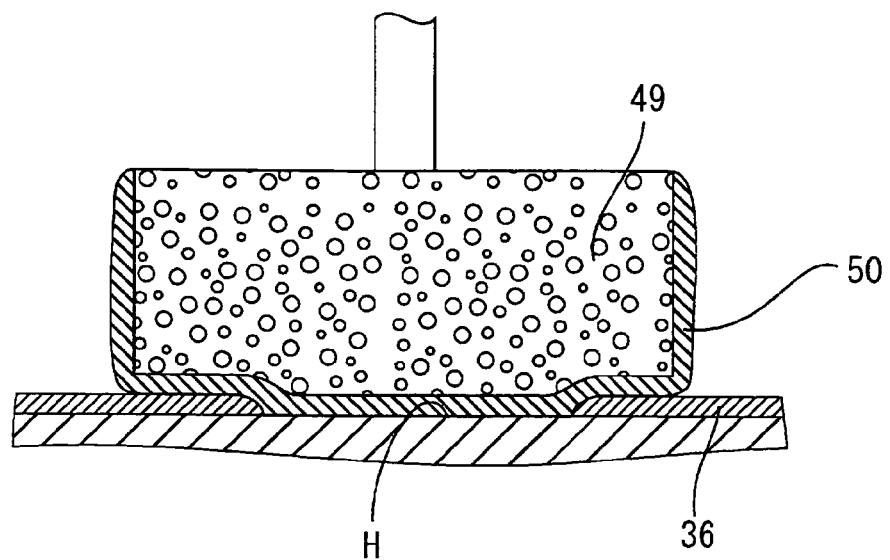
FIG. 12 is a sectional view showing when the transfer head is pressed to a pinhole smaller than the transfer head.
Figure 13:
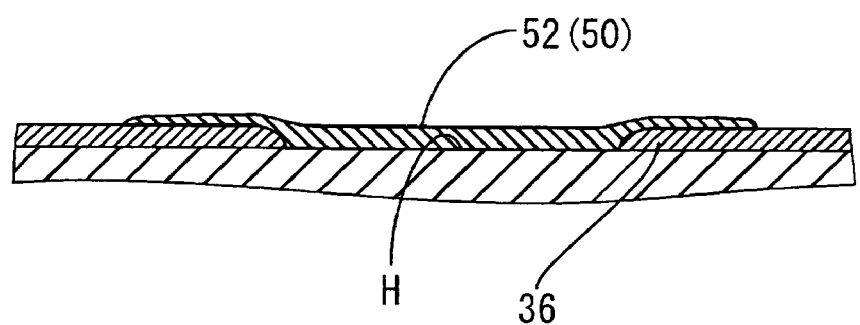
FIG. 13 is a sectional view showing when an alignment film repair filler is attached to the pinhole smaller than the transfer head and to the alignment film.

Next, explanation will be made on the case where a pinhole H is smaller than the transfer head 49 in size. In this case, as shown in FIG. 12, the transfer head 49 is applied so as to reach the alignment film 36 around the pinhole H, when the transfer head 49 is pressed against the pinhole H. At the time, the transfer head 49 elastically deforms so as to conform to steps formed between the pinhole H and the alignment film 36, and thereby can be tightly applied to the pinhole H and the alignment film 36. When the transfer head 49 is raised up after finishing the transfer, a repair part 52 is formed on the surrounding alignment film 36 as well as on the pinhole H, as shown in FIG. 13. The alignment film repair filler 50 is thus applied on the alignment film 36, which will cause no problem. However, an additional process for selectively removing the alignment film repair filler 50 applied on the alignment film 36 may be thereafter performed, so as to flatten the repair part 52.

Figure 14:
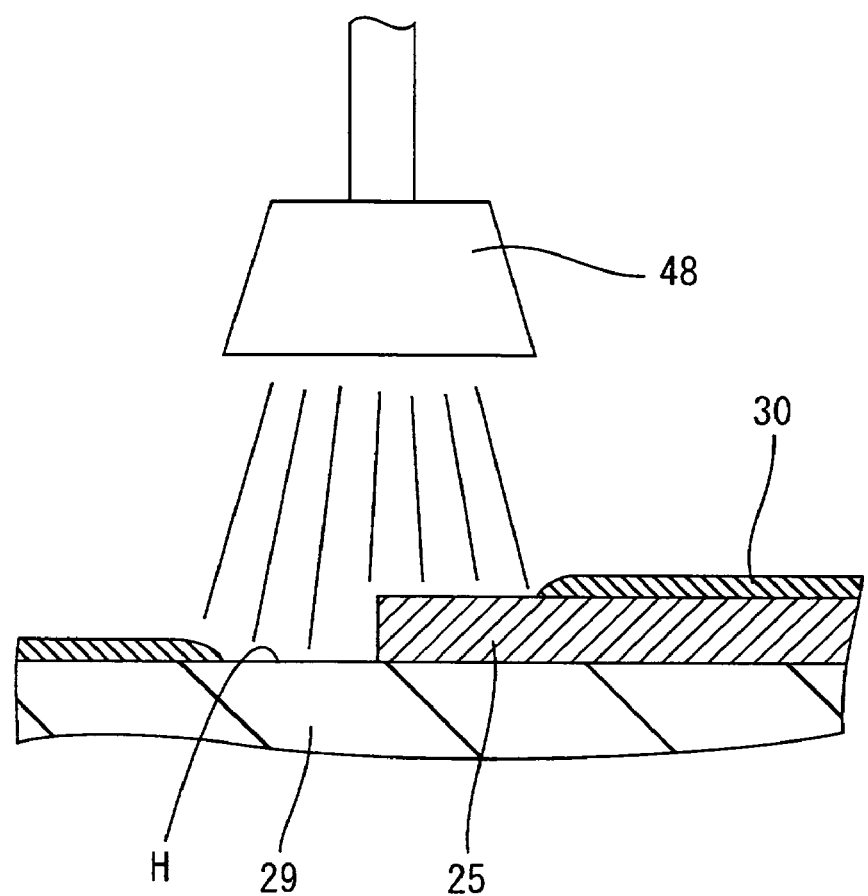
FIG. 14 is a sectional view showing when a pinhole on the array substrate is irradiated with excimer UV light.

Next, explanation will be made on the case where a pinhole H is formed as shown in FIG. 14 on the alignment film 30 on the array substrate 19, for example, so that an uneven exposed area of the underlying base (e.g., the pixel electrode 25 and the insulating layer 29 in FIG. 14) of the alignment film 30 is provided through the pinhole H. In this case, the organic matters adhering to the surface of the underlying base should be also destructed and removed by radiating excimer UV light from the UV radiation head 48 to the pinhole H, as in the above case with the CF substrate 18.

Figure 15:
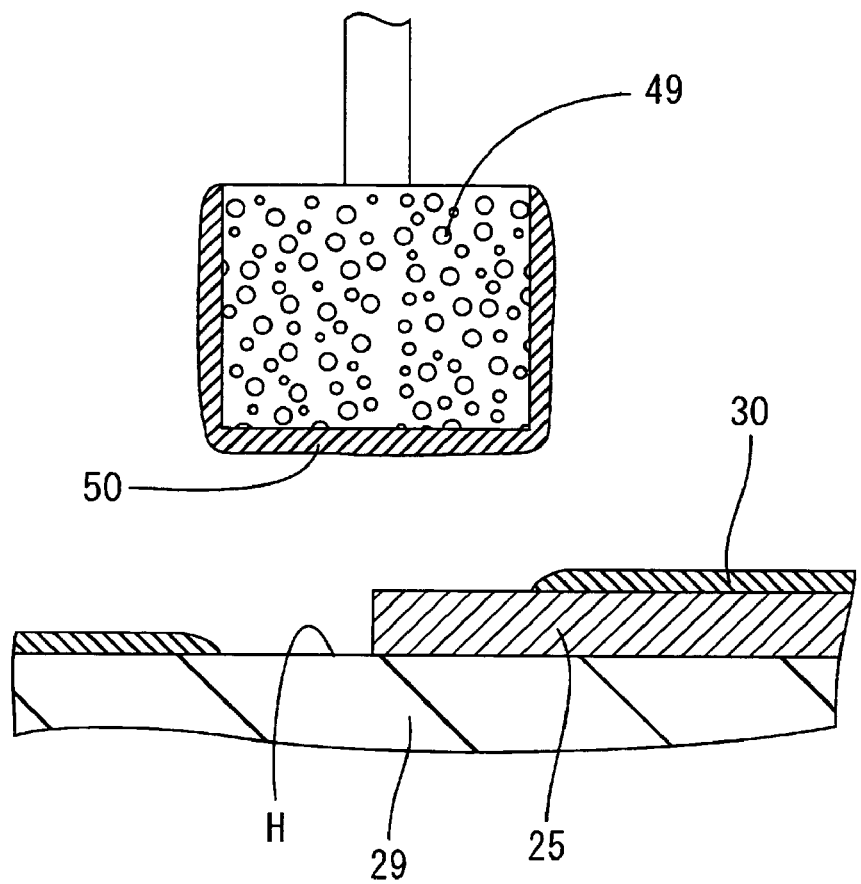
FIG. 15 is a sectional view showing when the transfer head is positioned to be aligned with the pinhole.
Figure 16:
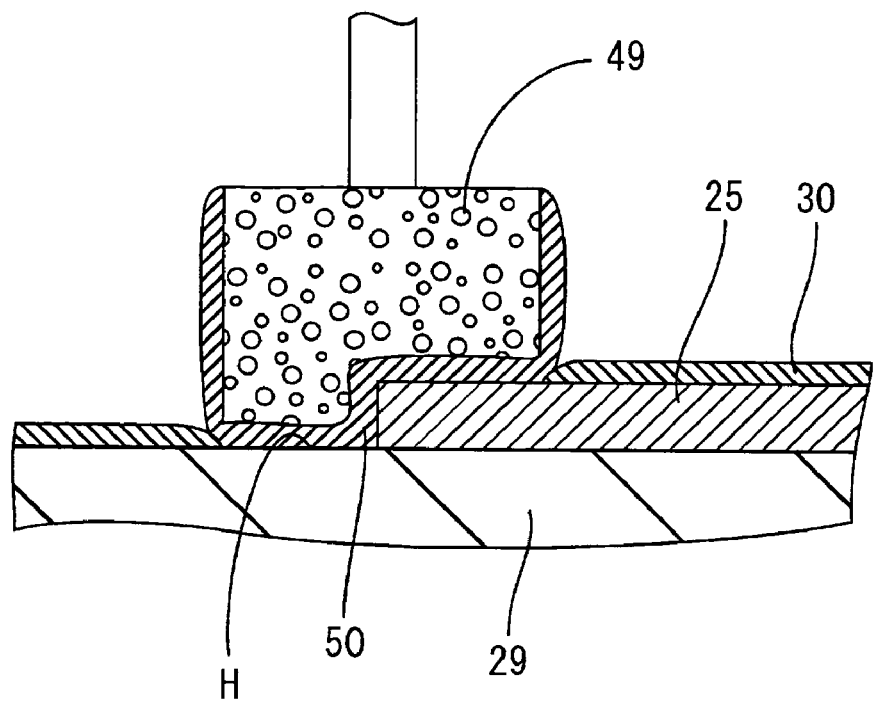
FIG. 16 is a sectional view showing when the transfer head is pressed to the pinhole.
Figure 17:
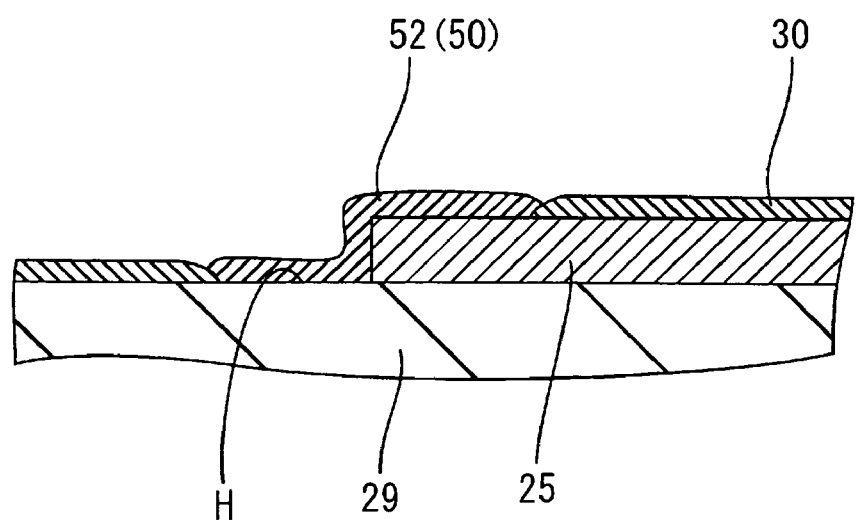
FIG. 17 is a sectional view showing when an alignment film repair filler is attached to the pinhole.

Thereafter, the transfer head 49 is positioned to be aligned with the pinhole H as shown in FIG. 15. Then, as shown in FIG. 16, the transfer head 49 is pressed against the pinhole H for a predetermined duration. At the time, the transfer head 49, made of a porous material having flexibility, elastically deforms so as to conform to the step-like shape of the underlying base, and thereby has intimate contact with the pinhole H with substantially no space therebetween. When the transfer head 49 is thereafter raised up, the alignment film repair filler 50 is transferred to the substantially entire area of the pinhole H, as shown in FIG. 17. The film thickness of the repair part 52 can be adjusted to conform to the alignment film 30 by controlling the duration time and/or the pressure intensity when pressing the transfer head 49 or by controlling the density of the alignment film repair filler 50, as in the above case with the alignment film 36 on the CF substrate 18 side. If the pinhole H is smaller than the transfer head 49 in size, the repair thereof can be achieved in a similar manner to the case with the alignment film 36 on the CF substrate 18 side.

The film thickness of the repair part 52 is most preferably set to correspond to that of the alignment film 30, 36, but cannot necessarily correspond thereto. In any case, it is preferable that the thickness of the repair part 52 is set to be equal to or smaller than 200 nm, independently of the film thickness of the alignment film 30, 36. The voltage value, applied as an assignment to the liquid crystal layer when a voltage is applied between the pixel electrodes 25 and the opposite electrode 34, depends on the film thicknesses of the alignment film 30, 36 and the repair part 52. When the film thickness of the repair part 52 is larger than 200 nm, for example, an insufficient voltage is applied as an assignment to the liquid crystal layer at a pixel associated with the repair part 52, which may cause a display failure. If the film thickness of the repair part 52 is set to be equal to or smaller than 200 nm as in the present embodiment, a sufficient voltage can be applied to the liquid crystal layer, resulting in excellent display performance. At the same time, the film thickness of the repair part 52 is preferably set to be equal to or larger than 50 nm, independently of the film thickness of the alignment film 30, 36. Thereby, an excess voltage can be prevented from being applied as an assignment to the liquid crystal layer when a voltage is applied as described above. Further, the alignment control for the liquid crystal molecules can be adequately achieved, so that a high stability in alignment of the liquid crystal molecules is maintained, resulting in excellent display performance. This is particularly effective in the case where alignment films 30, 36 of a vertical alignment type that induce a large pretilt angle are used as in the present embodiment.

After pinholes H are thus repaired, the array substrate 19 and the CF substrate 18 are attached to each other, and liquid crystal 20 is disposed therebetween. Thereafter, polarizing plates 22, 23 are applied to the outer surface sides of the respective substrates 18, 19. Thus, the liquid crystal panel 11 shown in FIG. 3 is fabricated. In the liquid crystal panel 11, the repair part 52 having a film thickness corresponding to that of the alignment film 30, 36 is formed on the pinhole H developed on the alignment film 30, 36. Thereby, excellent display performance can be obtained. Obviously, the pinhole H is not limited to those shown in the figures, but rather can have any other size and/or any other shape and can be developed at any position on the substrate 18, 19.

As stated above, according to the present embodiment, the alignment film 30, 36 is inspected for the presence of a pinhole H, and the position of the pinhole H is detected. Then, the pinhole H is repaired by applying an alignment film repair filler 50 to the pinhole H. Thereby, the yield rate can be improved, compared to the conventional case where an alignment film including a pinhole is re-formed, for example. Consequently, the manufacturing cost can be reduced.

In the repair process, a stamping technique is used so that the alignment film repair filler 50 is transferred to the pinhole H from the transfer head 49 on which the alignment film repair filler 50 is attached. Consequently, the film thickness of the repair part 52 can be readily adjusted, compared to the case where a technique for dropping droplets of an alignment film repair filler into a pinhole is used in a repair process, for example.

In the repair process, the transfer of the alignment film repair filler 50 is achieved by pressing the transfer head 49, on which the alignment film repair filler 50 is attached, against the pinhole H. Therefore, the film thickness of the repair part 52 can be readily adjusted by controlling the duration time and/or the pressure intensity when the transfer head 49 is pressed against the pinhole H. Further, a locally-developed pinhole H can be readily repaired, compared to the case where the transfer of an alignment film repair filler is achieved by a transfer roller, for example.

The alignment film repair filler 50 is formed by dissolving an alignment film material in solvent, and the waiting transfer head 49 after finishing the repair is immersed in the alignment film repair filler 50 in the container 51. Thereby, drying of the surface of the transfer head 49 due to evaporation of the alignment film repair filler 50 can be prevented.

The transfer head 49 is made of a porous material having flexibility, and thereby the film thickness of the repair part 52 can be further readily adjusted. Further, the alignment film repair filler 50 can be reliably attached to the pinhole H due to deformation of the flexible transfer head 49, even if a stepped area is provided around the pinhole H.

The surface modification process is performed before the repair process, in order to facilitate adhesion of the alignment film repair filler 50 to the pinhole H. Thereby, the repair can be reliably achieved.

In the surface modification process, the UV radiation head 48 radiates excimer UV light (ultraviolet light) to the pinhole H. Thereby, the surface modification can be suitably achieved. Further, the processing time can be reduced, compared to the case where the surface modification is achieved by a wet process, for example.

The wavelength of light radiated from the UV radiation head 48 is set to between 146 nm and 365 nm. Thereby, the surface modification can be further suitably achieved.

The alignment films 30, 36 of the liquid crystal panel 11 have a function for aligning the liquid crystal molecules in a direction substantially perpendicular to the surfaces of the alignment films 30, 36 when a voltage is not applied to the liquid crystal 20. Therefore, adhesion of the alignment films 30, 36 to the substrates 18, 19 may be degraded, and a pinhole H can be easily formed during the manufacture thereof. However, an alignment film repair filler 50 can be applied to the pinhole H so as to form a repair part 52. Thus, the pinhole H can be repaired so that the yield rate is effectively improved.

The ribs 35 or slits 31 for alignment control of the liquid crystal 20 are formed on the surface of the substrate 18 or 19 of the liquid crystal panel 11, so that the alignment film 36 or 30 is formed along the ribs 35 or the slits 31. Consequently, a larger area of the substrate 18, 19 may be covered with the alignment film 36, 30, and therefore a pinhole H can be easily formed. However, an alignment film repair filler 50 can be applied to the pinhole H so as to form a repair part 52. Thus, the pinhole H can be repaired so that the yield rate is effectively improved.

The film thickness of the repair part 52 is adjusted to between 50 nm and 200 nm, and thereby excellent display performance can be obtained.

Other Embodiments

The present invention is not limited to the embodiment explained in the above description made with reference to the drawings. The following embodiments may be included in the technical scope of the present invention, for example.

(1) Instead of the line sensor, other types of imaging means such as an area sensor may be used in the inspection process.

(2) In the inspection process, the substrate may be fixed, and the line sensor may be moved instead. In this case, the rotary encoder should be disposed on the drive section provided for driving the line sensor, so that a pulse signal from the rotary encoder is outputted to the defect detection circuit.

(3) The inspection/repair apparatus may include a foreign substance removal section, so that the removal operation for a foreign substance can be automatically performed when a foreign substance defect has been found in the inspection process.

(4) The line sensor may be eliminated from the inspection process so that a personnel detects pinholes with a microscope, for example. Alternatively, the inspection may be performed with a combination of a line sensor and a microscope.

(5) In the above embodiment, the inspection for the presence of a pinhole defect or a foreign substance defect and the detection of the position thereof are simultaneously performed in the inspection process (i.e., the inspection process includes the position detection process). However, the position detection process may be performed separately from the inspection process. Further, detection of a foreign substance defect may be eliminated from the inspection process, so that detection of a pinhole defect is solely performed. Conversely, a defect other than a foreign substance defect or a pinhole detect may be concurrently detected in the inspection process.

(6) In the surface modification process, wet cleaning may be performed instead of the dry cleaning.

(7) In the surface modification process, the UV radiation head may be fixed, and the light radiated therefrom may be reflected by a movable mirror, for example, so as to be applied to a target pinhole.

(8) In the surface modification process, the UV radiation head may radiate light at a wavelength out of the range of 146 nm to 365 nm (i.e., at a wavelength equal to or less than 146 nm, or equal to or larger than 365 nm), which can be also included in the present invention.

(9) In the repair process, a transfer head made of a material other than porous materials may be used.

(10) In the repair process, instead of applying an alignment film repair filler on the entire area of a pinhole, the alignment film repair filler may be applied to only a portion of the pinhole as long as improvement in display performance can be expected.

(11) Instead of the transfer head, a transfer roller may be used in the repair process for applying an alignment film repair filler to a pinhole.

(12) In the above embodiment, the liquid crystal panel, in which an alignment film material of vertical alignment type is used, is illustrated. However, the present invention can be also applied to constructions in which another type of alignment film material is used, such as a construction in TN mode, ECB mode or horizontal alignment mode.

(13) In the above embodiment, the liquid crystal panel, in which the ribs and slits provided as structures for alignment control of the liquid crystal, is illustrated. However, the present invention can be also applied to a liquid crystal panel in which the foregoing structures for alignment control are not provided.

(14) The present invention can be also applied to a construction that includes an alignment film having a film thickness out of the range of 100 nm to 200 nm (i.e., a thickness equal to or less than 100 nm, or equal to or larger than 200 nm).

(15) The repair part may have a film thickness out of the range of 50 nm to 200 nm (i.e., equal to or less than 50 nm, or equal to or larger than 200 nm), which can be also included in the present invention.

What is claimed is:

1. In a process of manufacturing a display panel in which liquid crystal is disposed between a pair of substrates arranged opposite to each other and a vertical alignment type alignment film for aligning molecules of the liquid crystal in a direction perpendicular to surfaces of the substrates is provided on at least one of the substrates, a display panel manufacturing method comprising:

inspecting the vertical alignment type alignment film for a presence of a film defective part by an inspection process;

detecting a position of the film defective part by a position detection process; and repairing the film defective part by attaching an alignment film repair filler to an exterior surface of a transfer head and by pressing the transfer head to the film defective part.

2. A display panel manufacturing method as in claim 1, further comprising:

forming an uneven portion for alignment control of the molecules of the liquid crystal on the substrate; and forming the vertical alignment type alignment film on a surface of the substrate having the uneven portion, wherein the transfer head has elastic flexibility and is pressed to the film defective part formed on the uneven portion so as to elastically deform to conform the uneven portion and the alignment film repair filler is transferred to the film defective part in the repairing process.

3. A display panel manufacturing method as in claim 1, wherein a film thickness of the film defective part to which the alignment film repair filler is transferred by the transfer head is set to between 50 nm and 200 nm.

4. A display panel manufacturing method as in claim 1, wherein the transfer head is formed of a porous material having flexibility.

5. A display panel manufacturing method as in claim 1, further comprising:

detecting a foreign substance defect; and removing the foreign substance defect.

6. A display panel manufacturing method as in claim 1, wherein the alignment film repair filler is formed by dissolving a vertical alignment type alignment film material in solvent, and the transfer head after finishing repair waits while being immersed in the alignment film repair filler .

7. A display panel manufacturing method as in claim 1, wherein a surface modification process for facilitating adhesion of the alignment film repair filler to the film defective part is performed before the repair process.

8. A display panel manufacturing method as in claim 1, wherein ultraviolet light is radiated to the film defective part in the surface modification process.

9. A display panel manufacturing method as in claim 8, wherein the ultraviolet light is radiated at a wavelength of 146 nm to 365 nm.

10. A display panel manufacturing apparatus for a display panel in which liquid crystal is disposed between a pair of substrates arranged opposite to each other, a vertical alignment type alignment film is provided on an opposed surface of the substrates, said display panel manufacturing apparatus comprising:

an inspection device arranged to inspect the vertical alignment type alignment film for a presence of a film defective part;

a position detection device arranged to detect a position of the film defective part; and a filler application device arranged to apply an alignment film repair filler to at least a portion of the film defective part so as to repair the film defective part, wherein said filler application device is a transfer head to which said alignment film repair filler is attached and pressed to the film defective part so as to transfer the alignment film repair filler to the film defective part.

11. A display panel manufacturing apparatus for a display panel having an uneven portion as in claim 10, wherein said transfer head has elastic flexibility and is pressed to the film defective part formed on the uneven portion so as to elastically deform to conform the uneven portion and said alignment film repair filler is transferred to the film defective part.

12. A display panel manufacturing apparatus as in claim 10, wherein said filler application device sets a film thickness of the film defective part to which said alignment film repair filler is transferred by said transfer head to between 50 nm and 200 nm.

13. A display panel manufacturing apparatus as in claim 10, wherein said transfer head is formed of a porous material having flexibility.

14. A display panel manufacturing apparatus as in claim 10, further comprising a foreign substance removal device, wherein:
    said inspection device detects a foreign substance defect;
    said position detection device detects a position of the foreign substance defect; and
    said foreign substance removal device removes the foreign substance defect.

15. A display panel manufacturing apparatus as in claim 10, further comprising a dryness prevention device, by which said alignment film repair filler formed by dissolving a vertical alignment type alignment film material in solvent is stored, and which is capable of containing said transfer head that is waiting after finishing repair.

16. A display panel manufacturing apparatus as in claim 10, further comprising a surface modification device arranged to modify a surface of the film defective part in order to facilitate adhesion of said alignment film repair filler to the film defective part.

17. A display panel manufacturing apparatus as in claim 16, wherein said surface modification device includes an ultraviolet radiator arranged to radiate ultraviolet light to the film defective part.

18. A display panel manufacturing apparatus as in claim 17, wherein said ultraviolet radiator is capable of radiating the ultraviolet light at a wavelength of 146 nm to 365 nm.

* * * * *